Dec. 16, 1930.   W. F. HAMILTON   1,785,411
IGNITION SYSTEM
Filed Jan. 10, 1929
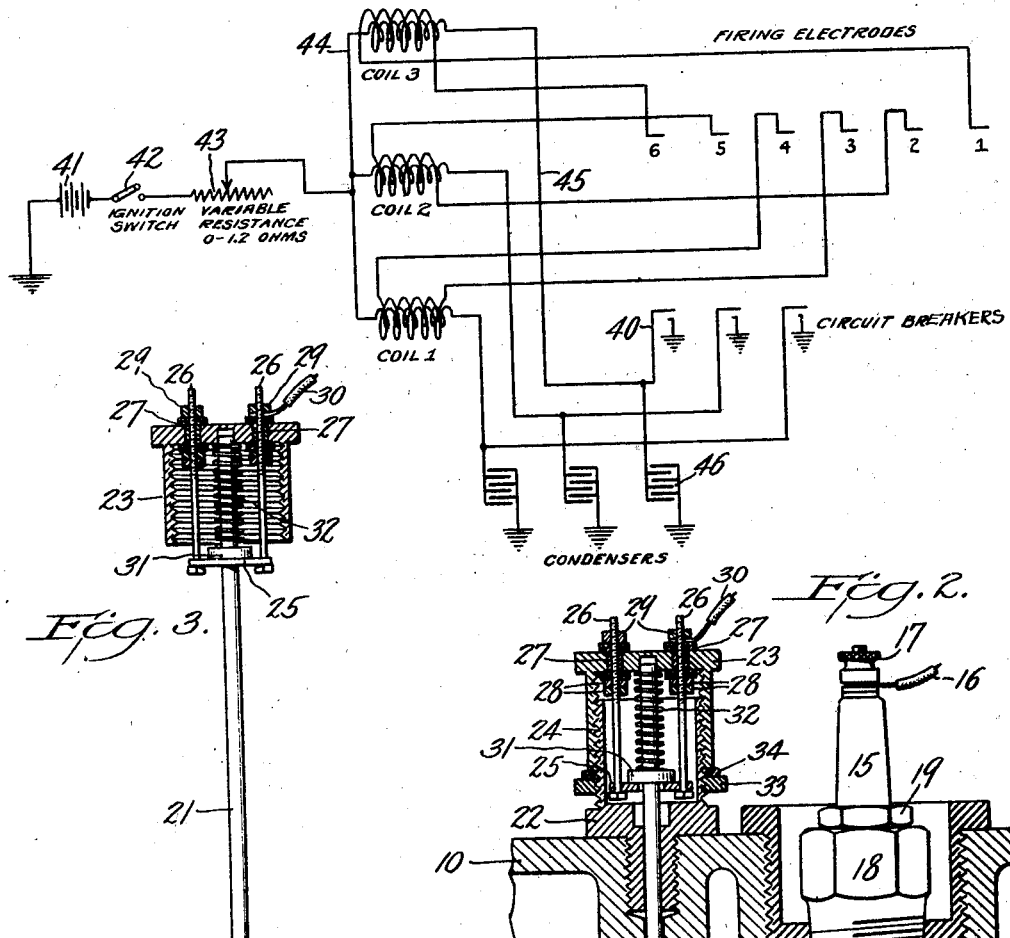
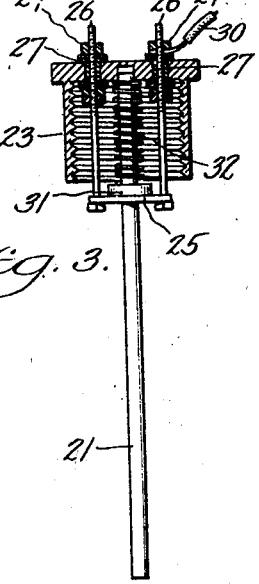
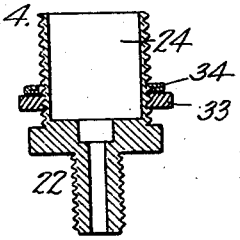
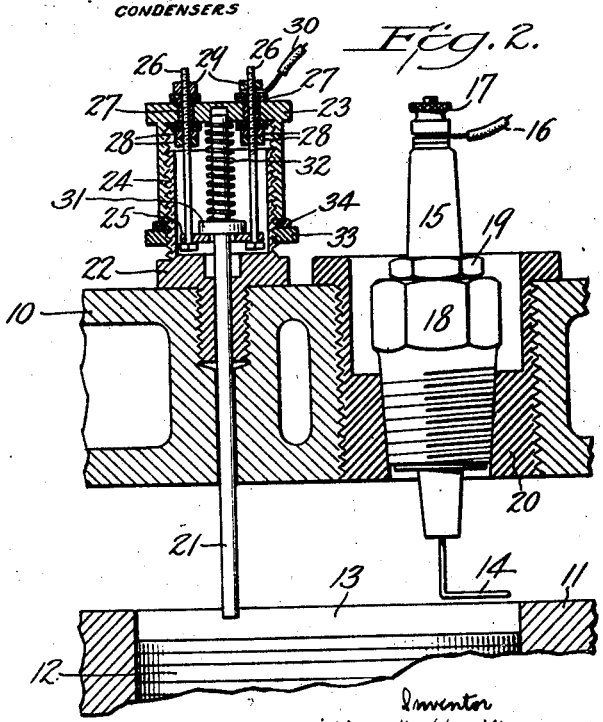

Patented Dec. 16, 1930

1,785,411

UNITED STATES PATENT OFFICE

WILLIAM F. HAMILTON, OF NEW YORK, N. Y., ASSIGNOR OF ONE-HALF TO FRANK S. ROLLINS, OF NEW YORK, N. Y.

IGNITION SYSTEM

Application filed January 10, 1929. Serial No. 331,496.

The present invention relates to ignition systems for internal combustion engines, and particularly to high tension ignition systems in which the breaking of a primary circuit induces a high potential into a secondary circuit, which causes the ignition spark to occur in the combustible mixture which is to be fired. The timing of the breaking of the primary circuit in such systems must be so adjusted as to cause the high tension spark to occur at the proper moment in the compressed charge, in order to attain a good efficiency. In engines of more than one cylinder, it is furthermore necessary to distribute the ignition current in the proper order in the several cylinders. Apart from the requirement of correct timing and proper distribution, the nature of the spark discharge within the compressed mixture determines, to a considerable extent, the efficiency of combustion under the conditions of operation in internal combustion engines, and there is a certain relation between the timing of the spark and the speed and load of the engine, which makes it necessary to vary the timing with different speeds and loads in the usual type of spark discharge employed in such engines.

In general, the present invention provides for highly accurate timing of the spark, an improved method of spark distribution, and a simplified relation between the timing of the spark and the speed and load of the engine. The timing of the spark is accomplished directly by primary circuit breakers actuated directly by the engine pistons, the distribution of the spark is likewise controlled directly by the pistons, and the relation of the timing to the varying speed and load of the engine is advantageously maintained constant by reason of the nature of the spark discharge which is obtained in accordance with the invention. The apparatus employed in accordance with the invention represents a substantial simplification and saving in cost of equipment as compared with the usual systems, and offers greater accuracy and reliability of operation.

An embodiment of the invention is illustrated by way of example in the accompanying drawing, in which—

Figure 1 is a circuit diagram of the ignition system;

Figure 2 is a vertical section through a primary circuit breaker and a spark plug electrode mounted in operative position above the piston;

Figure 3 is a detail view, with part in vertical section, showing one of the assembly units of a primary circuit breaker; and Figure 4 is a similar view showing the other assembly unit of the primary circuit breaker.

Referring to Figures 2, 3 and 4, 10 indicates the cylinder head disposed above the engine block 11 of, for example, a T-head motor. 12 indicates the top of a reciprocating piston operating in the cylinder 13. The spark electrode in cylinder 13 is indicated at 14 as comprising an L-shaped or otherwise laterally extended terminal disposed in parallel relation and within sparking distance of the piston at the top of the piston stroke. This electrode 14, apart from its particular shape as mentioned, may be mounted in a porcelain tube 15 in a manner well-known in the prevailing spark plug constructions, with its upper end connected by the lead wire 16 fastened in firm contact by the nut 17. The threaded plug 18, in which the porcelain tube 15 is secured by the nut 19, is screwed into a bushing 20 which is threaded into the cylinder head 10. It may be mentioned at this point that the lead wire 16 represents one of the high tension leads from the secondary of the transformer system, the other side of the transformer secondary being connected through the engine block to the piston 12 so that the space between electrode 14 and piston 12 represents one of the spark gaps of the secondary high tension portion of the system.

In a somewhat similar manner, the circuit breakers for the primary circuits of the transformer system are mounted over certain of the pistons 12, as will be more fully explained, these circuit breakers comprising a rod 21 which extends downwardly through the cylinder head 10 and across the compression space to a point slightly below the top of the piston throw so that as the piston 12 approaches its upper limit of movement, it engages the rod 21 and raises it to effect the opening of the primary circuit in timed relation to the piston movement. Rod 21 passes through a flanged nipple 22 which is threaded into the cylinder head 10, and the upper end of the rod 20 is guided in a recess formed in the wall of an inverted cup-like member 23 which is internally threaded to be screwed on to the externally threaded cup portion 24 of the nipple 22. These cup members 23 and 24 thus form a closed housing for the upper end of the rod 21 and certain moving parts which will be explained. This enclosed space or chamber is entirely shut off from the atmosphere so that the necessity of packing around the rod 21 to avoid loss of compression is obviated. On account of the distance of this enclosed chamber from the firing chamber, the temperature to which the enclosed parts are subjected approximates that of the surrounding atmosphere, and does not approach that which occurs in the combustion chamber. Within the cup 23 and cup 24 a perforated metallic disk or saddle 25 is supported on screws 26 which are insulated from the cup 23 by bushings 27 and adjustably fixed at suitable height by means of the nuts 28 and 29. The lead wire 30 coming from one side of the primary circuit is electrically connected to one of the screws 26 so that the saddle 25 constitutes one terminal of this circuit. The other terminal is formed by the flange or shoulder 31 which is provided on the rod or plunger 21 and is normally pressed resiliently in contact with saddle 25 by the compression spring 32 which is confined between the shoulder 31 and the top wall of the cup 23. The perforation in saddle 25 is of such diameter as to insure against making contact with the plunger 21 except by the seating of shoulder 31 upon the saddle 25. The plunger 21 being guided at its upper end in the recess in the top of cup 23 and having a sliding fit in nipple 22, is movable only straight up and down under the displacing action of piston 12 and the return action of spring 32. Since the shoulder 31 is normally held upon the saddle 25 by the pressure of spring 32, the primary circuit is normally closed through this contact and through the contact of the plunger with parts grounded in the cylinder head. When the plunger 21 is elevated by the piston 12, shoulder 31 is lifted out of contact with saddle 25 so that the primary circuit is opened. To insure the opening of this circuit at the proper moment, the cup 23 may be raised or lowered on the cup 24, thus carrying with it the assembly unit, shown in Figure 3, and causing the plunger 21 to be engaged by the piston 12 earlier or later while observing the effect upon the operation of the engine. Having been adjusted to proper position, the cup 23 may be locked on cup 24 by tightening lock nut 33 against the gasket 34 which at the same time seals the joint against leakage. Figures 3 and 4 illustrate the two units which constitute the circuit breaking mechanism and its means of mounting in the cylinder head. It will be noted that the moving parts of this mechanism are readily removable as a unit, and may be replaced when desired in much the same manner as the present-day spark plugs. The design illustrated is intended to permit the circuit breaker to be applied in the usual petcock opening in the cylinder head. Obviously, suitable provision for mounting the circuit breaker may be made at any other point where the plunger may be actuated by the piston.

A further feature of the invention resides in the electrical system of wiring, in combination with the new circuit breaker and ignition electrode. An embodiment of this circuit arrangement is illustrated by way of example in Figure 1. In this diagram, the engine is presumed to have six cylinders of which cylinders numbered 1 and 6 move up and down in unison, as do also cylinders 2 and 5 and cylinders 3 and 4. This arrangement is common in six cylinder motors. A firing electrode, such as already described, is provided for each of the six cylinders, and one circuit breaker is provided for each pair of cylinders which move in unison as above mentioned. Cylinders 1 and 6, for example, have their individual sparking electrodes which are connected to opposite ends of the secondary coil 3, this secondary circuit being completed across the spark gaps to the respective pistons, so that the spark gaps of the two cylinders are in series with each other. One of the circuit breakers is mounted over the piston in either cylinder No. 1 or cylinder No. 6 of this pair, such circuit breaker being indicated in Figure 1 at 40. This circuit breaker controls the flow of current through the primary circuit of coil 3, which circuit may be traced as follows: starting with battery 41, through ignition switch 42, variable resistance 43, parallel branch line 44, primary winding of coil 3, thence by primary lead 45 to circuit breaker 40 and, when the circuit at this point is closed, back to battery by way of the cylinder head. The breaking of this primary circuit at the point 40 in Figure 1 causes an oscillatory current to occur in the circuit comprising coil 3 and condenser 46, which latter is grounded in the engine block or cylinder head. This oscillatory current induces into the secondary winding of coil 3 a high tension which breaks down the resistance across the spark gaps 6 and 1 to the respective pistons. It will be noted that since this spark discharge occurs at the moment when these two pistons are both at the top of their stroke, one of them has compressed the fresh charge to be fired, whereas the other has just completed its exhaust stroke. Under such conditions the hot exhaust gases in, for example, cylinder No. 1, are in a highly ionized state and offer little resistance to the passage of current across the gap, and thus the principal energy is discharged in cylinder No. 6 which is ready for firing. Since the spark passes between the piston and the spark electrode, which present parallel surfaces to each other, the path of the spark will move laterally along the extended portion of the spark electrode to ignite the charge over an extended area. While it is not essential that the spark electrode be mounted in position to cause the spark to occur between this electrode and the piston, (since obviously the spark could be caused to occur between the electrode and any part of the engine block within the combustion chamber), it is to be observed if drawn between the electrode and the piston the spark will be stretched vertically by the downward motion of the piston as the latter recedes, and consequently a travelling spark of greater efficiency will be obtained. In this connection, it is pointed out that the maximum rate of flame propagation is decreased, and the average time necessary for combustion of the mixture is also decreased by the ignition obtained from such a form of spark discharge. These two factors of maximum rate of flame propagation and average time necessary for combustion of the mixture are variable in a given motor, and depend largely on the speed and load at which the motor is running. The maximum rate of flame propagation increases as the speed or the load is increased, whereas the time necessary for combustion of the mixture is decreased as the speed or load is increased. Due to the accurate timing of the spark and the character of the spark discharge, obtained in accordance with the principles of this invention, it is unnecessary to advance or retard the spark under varying conditions of speed and load.

The pair of cylinders, numbered 2 and 5, are provided with similar primary and secondary circuits and their circuit breaker, as are also the paired cylinders 3 and 4; and it is therefore unnecessary to repeat the description of these electrical connections.

In the construction shown and described, it will be observed that the primary circuit is normally closed through the circuit breaker so that the primary current will have time to build up to full strength between each closing and opening thereof. At high motor speeds, there will thus be no danger of reduced energy supplied to the secondary circuit. The make and break surfaces are of extended area and thus minimize pitting. By suitable adjustment of the position of the saddle 25 in the cup 23, and the position of cup 23 on cup 24, not only the timing of the circuit breaking operation but also the extent of movement of plunger 21, may be adjusted.

I claim:—

1. An ignition system for internal combustion engines, comprising primary and secondary circuits, the primary circuit including a normally closed piston actuated circuit breaker, and the secondary circuit including a spark electrode disposed in a combustion chamber within sparking distance of a wall thereof.

2. An ignition system for internal combustion engines, comprising primary and secondary circuits, the primary circuit including a normally closed piston actuated circuit breaker, and the secondary circuit including a spark electrode disposed in a combustion chamber within sparking distance of a piston.

3. An ignition control for internal combustion engines, comprising a housing substantially sealed from the combustion chamber over a piston, a spring pressed plunger extending into the path of the piston, and circuit terminals disposed in said housing and opened and closed by movement of said plunger.

4. An ignition control for internal combustion engines comprising an inverted cup, a perforated saddle of conductive material supported in insulated relation therein, a shouldered plunger of conductive material carried by said cup and passing with clearance through said perforated saddle, a spring resiliently seating the shoulder of said plunger on said perforated saddle, and means for mounting said cup on the cylinder head of an engine with the plunger extending into the path of a piston.

5. An ignition control for internal combustion engines, comprising a threaded nipple having a cup-like upper portion, an inverted cup adapted to form with said cup-like upper portion a sealed housing, a spring pressed plunger secured in said inverted cup and extending downwardly through said nipple, and make and break contacts within said housing operated by said plunger.

WILLIAM F. HAMILTON.